(12) United States Patent
Otter

(10) Patent No.: US 6,527,906 B1
(45) Date of Patent: Mar. 4, 2003

(54) ELASTOMER ADHESIVE FOR CONDENSING FURNACE HEAT EXCHANGER LAMINATE MATERIAL

(75) Inventor: James William Otter, Fairfield Glade, TN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/927,169

(22) Filed: Aug. 10, 2001

(51) Int. Cl.[7] .................................................. C09J 5/00
(52) U.S. Cl. ..................... 156/306.9; 156/329; 165/133
(58) Field of Search ....................... 165/133; 156/306.9, 156/329

(56) References Cited

U.S. PATENT DOCUMENTS

| | | | | |
|---|---|---|---|---|
| 4,023,618 A | * | 5/1977 | Kun et al. ..................... 165/76 |
| 4,953,511 A | * | 9/1990 | Boah et al. ..................... 122/18 |
| 5,477,918 A | * | 12/1995 | Grulke et al. ................ 165/133 |
| 5,623,988 A | * | 4/1997 | Holowczak et al. ..... 165/134.1 |

* cited by examiner

Primary Examiner—Margaret G. Moore
(74) Attorney, Agent, or Firm—Carlson, Gaskey & Olds, P.C.

(57) ABSTRACT

A film is adhered to a metal plate of a condensing heat exchanger by a cured layer of silicone RTV elastomer to prevent corrosion of the condensing heat exchanger. A layer of solid silicon RTV elastomer including an organosilicone functional group is applied on the pretreated metal surface. The metal plate is heated and a protective film is then applied. The film is adhered to the surface of the metal sheet by curing the layer of silicone RTV elastomer with the water. The water reacts with the organosilicone functional groups on the silicone RTV elastomer layer, cross-linking the organosilicone functional groups to create an adhesive surface which adheres the film to the surface.

10 Claims, 1 Drawing Sheet

ELASTOMER ADHESIVE FOR CONDENSING FURNACE HEAT EXCHANGER LAMINATE MATERIAL

BACKGROUND OF THE INVENTION

The present invention relates generally to a silicone room temperature vulcanizing (RTV) elastomer layer which adheres a film to a condensing heat exchanger without utilizing a primer and adhesive.

Condensing heat exchangers are employed in condensing furnaces to increase efficiency. The condensing heat exchanger cools the heating fluid to a temperature below the dew point. As the temperature drops below the dew point, a liquid condensate, water vapor, condenses from the heating fluid. As the liquid condensate condenses, heat is transferred from the water vapor to the air to be heated. As more heat is produced, the efficiency of the system is increased.

Polypropylene films are commonly utilized to make a laminate for a condensing furnace heat exchanger to prevent corrosion by the water vapor liquid condensate. The present method of making the laminate is expensive. A primer is first applied to the pretreated steel of the condensing heat exchanger. After a bake cycle, an adhesive is applied, following again by a bake cycle. The polypropylene film is then thermally laminated to the adhesive, attaching the film to the metal surface of the condensing heat exchanger.

There are several drawbacks to utilizing the primer and adhesive of the prior art. For one, both the primer and the adhesive contain high percentages of expensive solvents which must be combusted to meet "clean air" regulations. Additionally, the formulation of the primer is occasionally changed by the manufacturer, resulting in production problems and failed inspections.

Hence, there is a need in the art for a layer which adheres a film to a condensing heat exchanger without utilizing a primer and adhesive.

SUMMARY OF THE INVENTION

The present invention relates to a silicone RTV elastomer layer which adheres a film to a condensing heat exchanger without utilizing a primer and adhesive.

A film is adhered to a metal plate of a condensing heat exchanger by a cured silicone RTV elastomer to prevent corrosion of the condensing heat exchanger. The surface of the metal plate is pretreated by a layer of phosphate or chrome. A layer of solid silicon RTV elastomer including an organosilicone functional group which cross-links with the aid of water is then applied on the pretreated metal surface. Preferably, the layer of silicone RTV elastomer is applied by a roller. The silicone RTV elastomer layer is preferably applied between 0.1 and 10 mils in thickness.

After the layer of silicone RTV elastomer is applied to the surface of the condensing heat exchanger, the metal plate is heated and a protective film is applied. The film is adhered to the surface of the metal sheet by curing the layer of silicone RTV elastomer with water a room temperature. Water cross-links the organosilicone functional groups on the silicone RTV elastomer to create an adhesive surface which adheres the film to the surface.

Accordingly, the present invention provides a silicone RTV elastomer layer which adheres a film to a condensing heat exchanger without utilizing a primer and adhesive.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
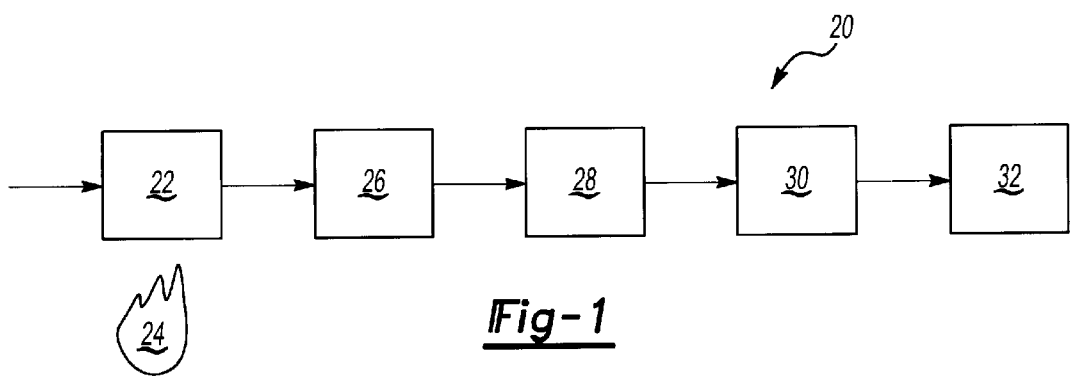
FIG. 1 illustrates a schematic diagram of a condensing furnace system.

FIG. 1 schematically illustrates a condensing furnace system 20. Air and natural gas enters a burner 22 which burns the air and natural gas by a flame 24 to produce hot combustion products. The hot combustion products pass through a primary heat exchanger 26, which cools the hot combustion products and extracts heat to the air to be heated. To increase the efficiency of the system 20, a condensing heat exchanger 28 is used to extract additional heat. As the hot combustion gases pass through the condensing heat exchanger 28, the condensing heat exchanger 28 cools the combustion products to a temperature below the dewpoint of the combustion products. Water vapor begins to condense, allowing more heat to be extracted from the combustion products and increasing efficiency. As the liquid condensate condenses, heat is transferred from the water vapor to the air to be heated. An inducer fan 30 provides a source of suction on the condensing heat exchanger 28 and assists in pulling the flow of the combustion products through the system 20. The combustion products are expelled from the system 20 through a flue 32.

Figure 2:
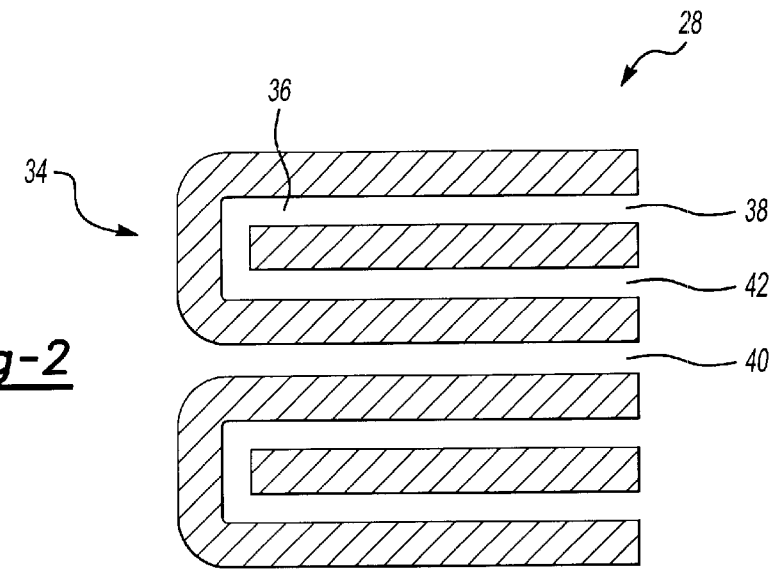
FIG. 2 illustrates a schematic diagram of a pair of cells of a condensing heat exchanger.

FIG. 2 illustrates a pair of cells 34 of the condensing heat exchanger 28. Each cell 34 including a flow passage 36 through which the combustion products or flue gases flow. The hot flue gases enter the flow passage 36 through an inlet 38. As the hot flue gases flow through the flow passage 36, heat is transferred to the air to be heated which flows in the air passage 40 between the cells 34. The cooled flue gases then exit the cell 34 through the outlet 42. Although only two cells 34 are illustrated, a plurality of cells are employed in the condensing heat exchanger 28.

Figure 3:
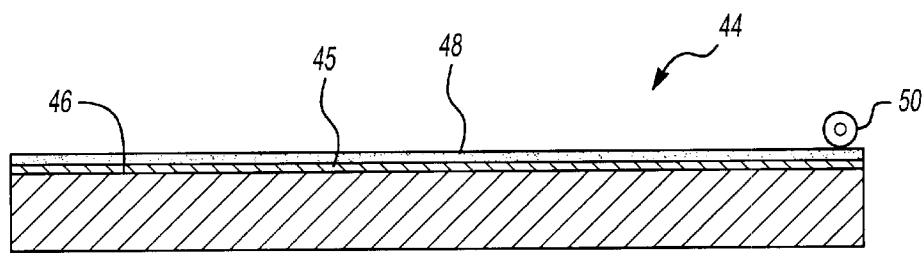
FIG. 3 illustrates a schematic diagram of a metal plate of a condensing heat exchanger with a layer of silicone RTV elastomer.
Figure 4:
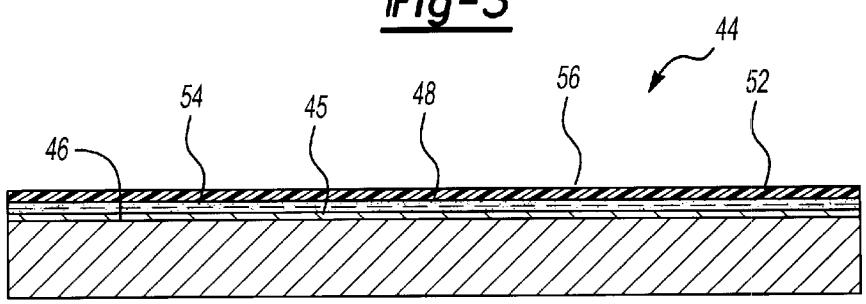
FIG. 4 illustrates a schematic diagram of a metal plate of a condensing heat exchanger with a film applied on the layer of silicone RTV elastomer.

A schematic view of the metal plate 44 used to form the condensing heat exchanger 28 is illustrated in FIG. 3. Preferably, the metal plate 44 is pretreated by applying a layer of phosphate or chrome 45 to the surface 46 to improve corrosion resistance. The layer of phosphate or chrome 45 additionally holds moistures and encourages the adhesion of a layer of silicone RTV (room temperature vulcanizing) elastomer 48 to the surface 46 of the metal plate 44.

A coating of a layer of silicone RTV elastomer 48 including an organosilicone functional group is applied to the surface 46 of the metal plate 44. Silicone is a compound containing a chain of alternating silicon and oxygen atoms with hydrocarbons attached to the silicon atoms. An organosilicone functional group is located on the end of the chain. Any organosilicone functional group which cross-links with the aid of water can be used. The silicone RTV elastomer layer 48 is applied to the surface 46 as a solid. Preferably, the layer of silicone RTV elastomer 48 is applied by a roller 50. However, other methods of application are possible, and one skilled in the art would understand how to apply the layer of silicone RTV elastomer 48. The high solids uncured silicone elastomer layer 48 is preferably applied as a thin layer preferably between 0.1 and 10 mils in thickness.

After the layer of silicone elastomer 48 is applied to the surface 46 of the condensing heat exchanger 28, the metal plate 44 is heated. The film 52 is then applied over the solid layer of elastomer 48. Preferably, the film 52 is polypropylene. The film 52 is adhered to the surface 46 of the metal sheet 30 by curing the layer of silicone RTV elastomer 48 with water 54. Water 54 causes a reaction which cross-links the organosilicone functional groups in the solid silicone RTV elastomer layer 48, creating an adhesive surface which adheres the film 52 to the surface 46 of the metal plate 44.

Preferably, the water 54 which cures the silicone RTV elastomer layer 48 is contained in the film 52. The water permeates through the film 52 and reacts with the layer of silicone RTV elastomer layer 48, cross-linking the organosilicone functional groups. Alternatively, the water 54 is applied to the surface 46 of the metal sheet 44 prior to the application of the layer of silicone RTV elastomer layer 48. The water can also be applied to the upper surface 56 of the film 52 after application over the layer of silicone RTV elastomer layer 48. The water 54 permeates through the film 52 and cross-links the organosilicone functional groups. Alternatively, the water 54 is supplied by steam which permeates the film 52.

There are several advantages to employing the silicone RTV elastomer layer 48 of the present invention to attach a film 52 to the surface 46 of a metal plate 44 of a condensing heat exchanger 28. For one, as a primer is not used, there is a reduction to the release of volatile organic compound (VOC) during the manufacturing process. Films 52 with a lower surface energy can be adhered to the condensing heat exchanger 28 which are usually difficult to adhere by adhesives or direct thermal lamination. The silicone RTV elastomer layer 48 has high thermal resistance to flue gases and to the acidic condensate formed in the condensing heat exchanger 28. Therefore, the temperature of the flue gases can be increased. Finally, the silicone RTV elastomer layer 48 is flexible and allows forming, whereas the adhesive of the prior art is relatively brittle.

Accordingly, the present invention provides a silicone RTV elastomer layer which adheres a film to a condensing heat exchanger without utilizing a primer and adhesive.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for adhering a film to a condensing heat exchanger comprising the steps of:

applying a layer of a room temperature vulcanizing silicone elastomer including an organosilicone functional group to said condensing heat exchanger;

applying said film to said layer of silicone elastomer; and curing said layer of silicone elastomer to adhere said film to said condensing heat exchanger.

2. The method as recited in claim 1 wherein the step of applying said layer of silicone elastomer includes application by a roller.

3. The method as recited in claim 1 wherein said film is polypropylene.

4. The method as recited in claim 1 wherein the step of curing said layer of room temperature vulcanizing silicone elastomer includes adding water to said layer of silicone elastomer to cross-link said organosilicone functional groups.

5. The method as recited in claim 1 further comprising the step of pre-treating a surface of said heat transfer component.

6. The method as recited in claim 5 wherein the step of pre-treating said heat transfer component includes phosphating said surface of said heat transfer component.

7. The method as recited in claim 5 wherein the step of pre-treating said heat transfer component includes chromating said surface of said heat transfer component.

8. The method as recited in claim 1 wherein said layer of silicone elastomer is between 0.1 and 10 mils in thickness.

9. A heat transfer component of a condensing furnace system comprising:

a metal surface;

a film adhered to said metal surface; and a layer of room temperature vulcanizing silicone elastomer including a cured organosilicone functional group to adhere said film to said metal surface.

10. The heat transfer component as recited in claim 9 wherein said layer of silicone elastomer is between 0.1 and 10 mils in thickness.

* * * * *